(12) United States Patent
Hallgren

(10) Patent No.: US 8,814,463 B2
(45) Date of Patent: Aug. 26, 2014

(54) DEVICE FOR INTERCONNECTING A FIRST ELEMENT AND A SECOND ELEMENT AS WELL AS A PUMP COMPRISING SUCH A DEVICE

(75) Inventor: Gert Hallgren, Hagersten (SE)

(73) Assignee: Xylem IP Holdings LLC, White Plains, NY (US)

( * ) Notice: Subject to any disclaimer, the term of this patent is extended or adjusted under 35 U.S.C. 154(b) by 485 days.

(21) Appl. No.: 12/443,520

(22) PCT Filed: Aug. 29, 2007

(86) PCT No.: PCT/SE2007/050589
§ 371 (c)(1), (2), (4) Date: Mar. 30, 2009

(87) PCT Pub. No.: WO2008/039143
PCT Pub. Date: Apr. 3, 2008

(65) Prior Publication Data
US 2010/0074676 A1  Mar. 25, 2010

(30) Foreign Application Priority Data
Sep. 20, 2006 (SE) .................................... 0602040

(51) Int. Cl.
*F16B 7/02* (2006.01)
(52) U.S. Cl.
USPC ........................................ 403/374.4; 464/78
(58) Field of Classification Search
USPC .............. 403/367, 368, 370, 371, 372, 374.2, 403/374.3, 374.4; 416/244 A, 244 B, 244 R; 464/78
See application file for complete search history.

(56) References Cited

U.S. PATENT DOCUMENTS

| | | | |
|---|---|---|---|
| 9,805 | A | 6/1853 | Sherrod |
| 1,166,408 | A | 12/1915 | Blood |

(Continued)

FOREIGN PATENT DOCUMENTS

| | | | |
|---|---|---|---|
| EP | 1 026 405 A2 | 8/2000 | |
| GB | 2034861 A | 6/1980 | |

(Continued)

OTHER PUBLICATIONS

English translation of Japanese Official Action of Application No. 2009-529154 dated Sep. 6, 2011.

(Continued)

*Primary Examiner* — Joshua Kennedy
*Assistant Examiner* — James Linford
(74) *Attorney, Agent, or Firm* — Browdy and Neimark, PLLC

(57) ABSTRACT

In a first aspect the invention relates to a device for interconnecting a first element (2) and a second element (1) to each other in order to transmit a rotational motion. The device (3) comprises a tubular wall (4) having a circular inner surface, a part of which that is adjacent to said first end being arranged to abut said first element (2), and having a circular outer surface, a part of which that is adjacent to said first end being arranged to abut said second element (1). Furthermore, said tubular wall (4) comprises at least one pair of slits (18), which slits (18) are adjacent to each other and extends from said first end towards said second end, obtaining a finger shaped segment (19), which is deflectable in relation to neighboring parts of said tubular wall (4). The invention also relates to a pump comprising such a device (3).

10 Claims, 3 Drawing Sheets

(56) References Cited

U.S. PATENT DOCUMENTS

| | | | |
|---|---|---|---|
| 2,262,112 A | 11/1941 | Nash | |
| 2,447,299 A * | 8/1948 | Williams | 403/247 |
| 2,450,918 A * | 10/1948 | Royal | 74/10.35 |
| 2,554,348 A * | 5/1951 | Rudolph | 403/7 |
| 4,345,851 A * | 8/1982 | Soussloff | 403/369 |
| 4,600,334 A | 7/1986 | Soussloff | |
| 4,615,640 A | 10/1986 | Hosokawa | |
| 5,046,693 A * | 9/1991 | Browne | 248/159 |
| 5,174,680 A | 12/1992 | Nakamura | |
| 5,730,546 A * | 3/1998 | Kato et al. | 403/404 |
| 6,305,906 B1 * | 10/2001 | Ekstrom | 416/244 R |
| 6,712,544 B2 * | 3/2004 | Kruger et al. | 403/408.1 |
| 2005/0089364 A1 | 4/2005 | Geib | |
| 2005/0220534 A1 | 10/2005 | Ober | |

FOREIGN PATENT DOCUMENTS

| | | |
|---|---|---|
| GB | 2207216 A | 1/1989 |
| JP | 49-109756 A | 10/1974 |
| JP | 2-103205 A | 5/1992 |
| JP | 2000-220653 A | 8/2000 |
| SE | 513 611 C2 | 10/2000 |

OTHER PUBLICATIONS

Extended European Search Report of European Patent Appln. No. 07794199.5 mailed Feb. 10, 2014.

* cited by examiner

US 8,814,463 B2

DEVICE FOR INTERCONNECTING A FIRST ELEMENT AND A SECOND ELEMENT AS WELL AS A PUMP COMPRISING SUCH A DEVICE

TECHNICAL FIELD OF THE INVENTION

The present invention relates generally to the field of devices for interconnecting elements to each other in order to transmit a rotational motion, and more specifically to a device for a pump, which device is arranged to interconnect an impeller and a drive shaft. Further, the present invention relates specifically to the field of pumps for sewage or waste water. The device comprises an axial through hole that extends from a first end to a second end and generates a tubular wall having a circular inner surface, a part of which that is adjacent to said first end being arranged to abut said first element, and having a circular outer surface, a part of which that is adjacent to said first end being arranged to abut said second element. The invention also relates to a pump comprising such a device.

BACKGROUND OF THE INVENTION

Conventional pumps—specifically centrifugal or axial pumps—comprises a rotatable impeller mounted onto a drive shaft, which impeller must be interconnected to the drive shaft in a suitable way that provides a rigid and non-rotational connection. At the same time it should be possible to adjust the axial location of the impeller in relation to the drive shaft, in order to adjust the location of the impeller in relation to the impeller seat when the impeller wears.

One known way to interconnect a first element and a second element to each other in order to transmit a rotational motion, is to use a key and key-way joint, which comprises a key that is inserted into opposite key-ways in the respective elements. Such a joint is often to a great extent appropriate but it is often difficult to release the elements from each other without damaging them, it is also difficult to adjust the mutual axial location of the elements.

Another known way to interconnect a first and a second element to each other, is to use a tubular shaped socket, e.g. as is shown in EP 1,026,405. The socket is inserted into a centrally located recess in an impeller and then a drive shaft is inserted into said socket. The impeller is forced towards the drive shaft by means of a bolt, which causes the socket to become squeezed between the impeller and the drive shaft. Thus, by means of friction the socket will transmit a rotational motion from the drive shaft to the impeller. However, high initial starting torque or other types of sudden jerks, which may occur especially when the pump operates in heavily polluted liquids, tend to cause a small slip between the impeller and the socket and/or between the drive shaft and the socket. Consequently, the different elements will wear and the interconnection of the impeller and the drive shaft will deteriorate, the consequence being that the transmission of rotational motion may be lost.

SUMMARY OF THE INVENTION

The present invention aims at obviating the aforementioned disadvantages of previously known interconnection devices, and at providing an improved device. A primary object of the present invention is to provide an improved device of the initially defined type with respect to the ability of transmitting a rotational motion between two elements. It is another object of the present invention to provide a device, which upon sudden jerks provides a better interconnection of the two elements. It is another object of the present invention to provide a device which does not involve any need of redesign of the interconnected elements. It is yet another object of the present invention to provide a device having an improved durability.

According to the invention at least the primary object is attained by means of the initially defined device and pump having the features defined in the independent claims. Preferred embodiments of the present invention are further defined in the dependent claims.

According to a first aspect of the present invention, there is provided a device of the initially defined type, which is characterized in that said tubular wall comprises at least one pair of slits, which slits are adjacent to each other and extend from said first end towards said second end, obtaining a finger shaped segment of the tubular wall, which finger shaped segment is deflectable in the circumferential direction in relation to neighboring parts of said tubular wall. According to a second aspect of the present invention, there is provided a pump including the device described above.

Thus, the present invention is based on the insight of utilizing a partly deflectable device for obtaining a better transmittal of a rotational motion between two elements even though said elements are subject to sudden jerks, high momentary resistance, etc.

In a preferred embodiment of the present invention, the device comprises at least two pairs of slits, which pairs are distributed along the periphery of the tubular wall. This means that each finger shaped segment that is created will contribute to the increase of the frictional force between the first element and the second element.

According to a preferred embodiment, the radial extension of each slit coincides with a geometrical plane, which is separated from the longitudinal axis of the device. Thereby the surfaces of the slit will be inclined in relation to the circumferential direction of the tubular wall, which result in that the finger shaped segment will be partially wedged between the neighboring part of the tubular wall and the first or second element and thus the frictional force will increase.

BRIEF DESCRIPTION OF THE DRAWINGS

A more complete understanding of the above-mentioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

Figure 1:
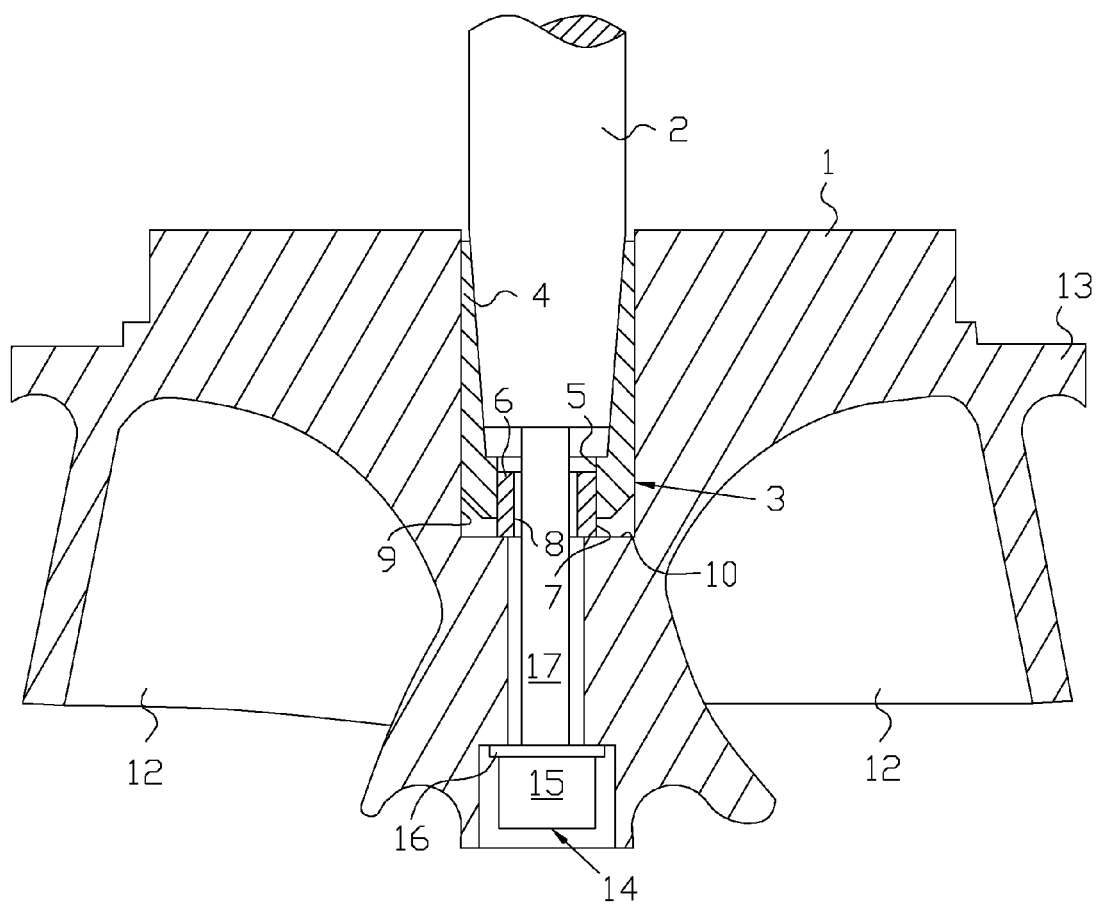
FIG. 1 is a schematic cross sectional side view of an impeller attached to a drive shaft by means of an inventive device.
Figure 2:
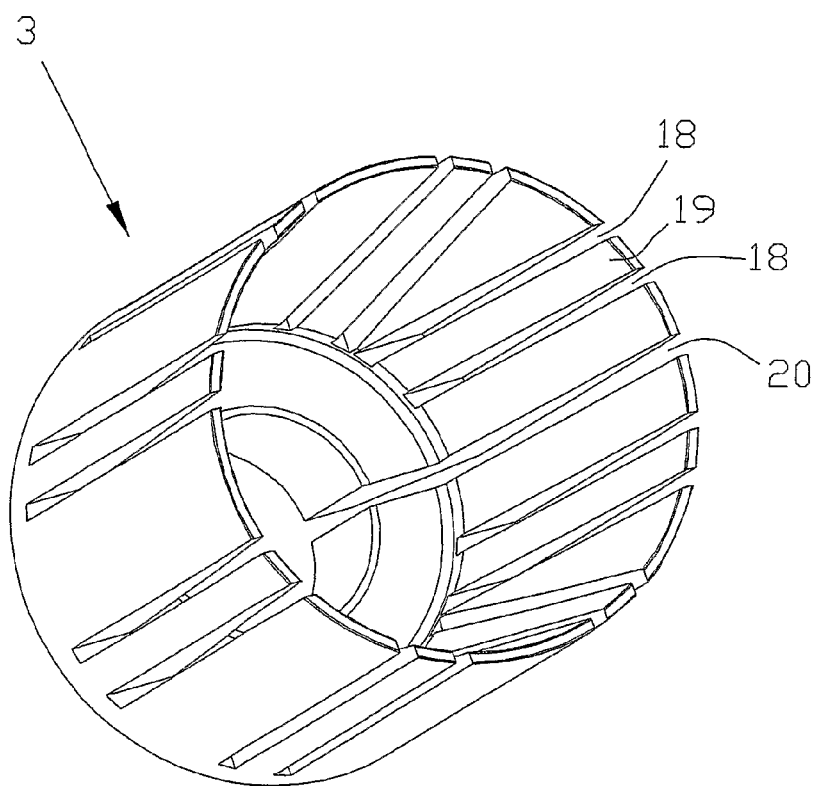
FIG. 2 is a perspective view from above of an inventive device.
Figure 3:
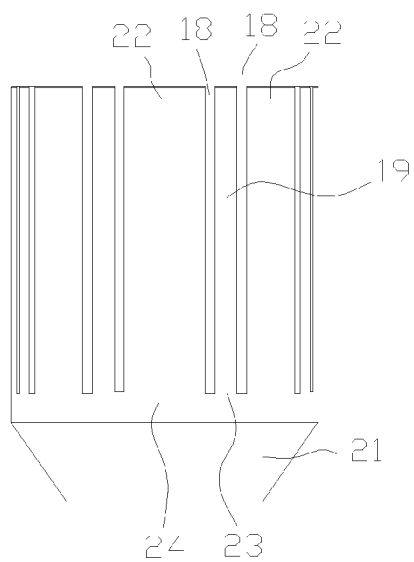
FIG. 3 is a side view of the device shown in FIG. 2.
Figure 4:
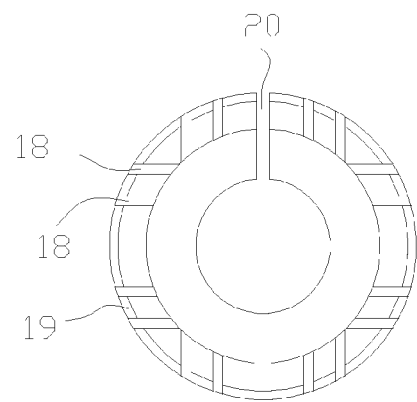
FIG. 4 is a view from above of the device shown in FIG. 2.
Figure 5:
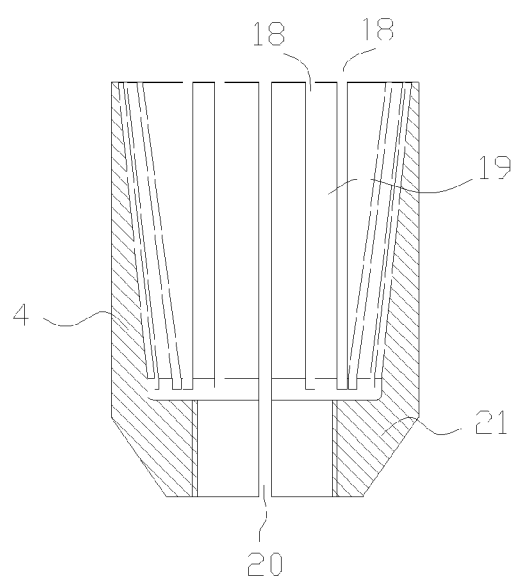
FIG. 5 is a cross sectional side view of the device shown in FIG. 2.
Figure 6:
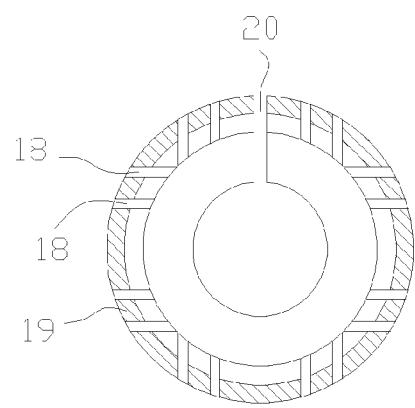
FIG. 6 is a cross sectional view from above of the device shown in FIG. 2.

FIG. 1 shows a schematic cross sectional view of an impeller 1, a drive shaft 2, and a device 3, or socket, according to the invention, said device 3 being arranged between said impeller 1 and said drive shaft 2 in order to interconnect them to each other. Even thus the inventive device 3 has a broad applicability, i.e. to interconnect a first and a second element to each other in order to transmit a rotational motion, the device will be described arranged in a pump (not fully shown). The invention relates according to a second aspect to pumps in general, but in the described embodiment the pump is constituted by a submergible centrifugal pump. In FIG. 1 most parts of the pump are removed for the sake of simplicity of reading the figure.

The location of the impeller 1 in relation to an impeller seat (not shown) is of great importance for obtaining a suitable operating performance of the pump. When a pump pumps liquids containing solid matter, such as strongly abrasive particles, the impeller 1 as well as the impeller seat will be worn. Thus, after a certain time of operation the actual gap between the impeller 1 and the impeller seat will be different from an optimized initially installed gap. More precisely, the location of the impeller 1 in relation to the impeller seat is preferably adjustable.

The drive shaft 2 extends from a motor (not shown) comprised in the pump, and presents a free lower end. In a preferred embodiment, said lower end is provided with the shape of a truncated circular cone, converging in the distal direction. The drive shaft 2 constitutes the first element that is about to be interconnected.

The inventive device 3, or socket, comprises an axial through hole that extends from a first end to a second end, and that generates a tubular wall 4, which constitutes the actual socket 3. The tubular wall 4 presents a circular inner surface, at least over a part of the length thereof, and a circular outer surface, at least over a part of the length thereof. A part of the inner surface that is adjacent to said first end of the socket 3 is, preferably in the shape of a truncated circular cone diverging towards said first end of said socket 3, and arranged to abut the envelope surface of said lower end of the drive shaft 2. The inclination of the conical inner surface of the tubular wall 4, in relation to a longitudinal axis of the socket 3, is preferably above 3° and below 10°, and is in the shown embodiment approximately 6°. A part of the inner surface that is adjacent to said second end of the socket 3 is preferably in the shape of a threaded hole 5. In such a case may an adjusting screw 6, having an external thread 7 and a central through hole 8, be screwed into the threaded hole 5 of the socket 3.

The impeller 1 is provided with a central hub having an axial through hole 9, an intermediate portion of which having a smaller diameter than the two end portions of said through hole 9, such that a first shoulder 10 and a second shoulder 11 are provided at the transitions from the bigger diameters of the ends to the smaller diameter of the intermediate portion. Furthermore, the impeller 1 comprises at least one vane 12 extending in a spiral shape from the central hub towards the periphery of the impeller 1, preferably two vanes 12. Furthermore, the impeller 1 comprises a cover disc 13, to which said vanes 12 are connected. The impeller 1 constitutes the second element that is about to be interconnected.

One way of mounting the impeller 1 onto the drive shaft 2, using the inventive socket 3, will now be described. Upon mounting of the impeller 1 onto the drive shaft 2, the socket 3 is first slid onto the lower end of the drive shaft 2 and the adjusting screw 6 is screwed into the threaded hole 5 of the socket 3, preferably until it comes in alignment with the second end of the socket 3. In other words, does not protrude beneath the second end of the socket 3. Then, the socket 3 and the drive shaft 2 are inserted into the through hole 9 of the impeller 1. A part of the outer surface of the socket 3, which part is adjacent to said first end of the socket 3 is, preferably in the shape of a circular cylinder, and arranged to abut the surface of the through hole 9 of the impeller 1. Preferably a fastening means 14, e.g. a fastening screw, is used to fixate the impeller 1 to the drive shaft 2. The head 15 of the fastening screw 14 abuts said second shoulder 11 of the through hole 9 of the impeller 1, directly or indirectly by means of a washer 16, and the stem 17 of the fastening screw 14 extends through the intermediate portion of the through hole 9 of the impeller 1 and through the through hole 6 of the adjusting screw 5 and into a threaded hole (not shown) of the lower end of the drive shaft 2. Upon tightening of the fastening screw 14 the second end of the socket 3 will abut the first shoulder 10 of the through hole 9 of the impeller 1, and subsequently the socket 3 will be pressed onto the lower end of the drive shaft 2, and thereby be squeezed between the drive shaft 2 and the impeller 1. The fastening screw 14 shall only be tightened just enough to keep the impeller 1 temporarily in place by means of friction. It is always important that the lower end surface of the drive shaft 2 does not abut the inner surface of the socket 3, i.e. that the axial mutual movement of the socket 3 onto the drive shaft 2 is only restricted by the wedging effect, and that the drive shaft 2 does not touch bottom of the socket 3.

Thereafter above-mentioned impeller seat together with other parts are attached to the rest of the pump housing of the pump in order to obtain a pump chamber which accommodates the impeller 1. When the pump is assembled a gap will occur between the impeller 1 and the impeller seat, which gap almost always has to be adjusted in order to obtain an optimized operating performance. The fastening screw 14 is unscrewed and then the adjusting screw 6 is unscrewed to a certain degree, thereby abutting the first shoulder 10 of the impeller 1 and pressing the impeller 1 towards the impeller seat. Usually, the adjusting screw 6 is unscrewed all the way until the impeller 1 comes in contact with the impeller seat. Thereafter, the fastening screw 14 is once again screwed into the drive shaft 2 and tightened with a prescribed torque, which causes the impeller 1 to be positioned spaced apart from the impeller seat and a suitable gap is obtained, at the same time as the socket 3 is pressed further onto the lower end of the drive shaft 2. If the impeller 1 is worn during operation, another adjustment may be performed, and this may be repeated whenever needed or at different intervals.

When the socket 3 is pressed onto the lower end of the drive shaft 2, it is widen until it abuts the surface of the through hole 9 of the impeller 1. Thereby the socket 3 is squeezed between the impeller 1 and the drive shaft 2, and will by means of friction transmit a rotational motion from the drive shaft 2 to the impeller 1.

One way of demounting the impeller 1 from the drive shaft 2, is to tighten the adjusting screw 6 towards the lower end of the drive shaft 2, thus pressing the impeller 1 and the socket 3 downwards until they come loose. When the socket 3 disengage the drive shaft 2 it will at the same time come loose from the impeller 1.

The socket 3 will now be described in detail in conjunction with FIGS. 2-6, in which a preferred embodiment of the inventive device is shown.

The tubular wall 4 is in the shown embodiment of a slender shape adjacent to the first end of the socket 3 and of a more rigid shape adjacent to the second end of the socket 3. The outside of the tubular wall 4 adjacent to the second end of the socket 3, is preferably in the shape of a truncated cone converging in the distal direction forming a base 21, in order to facilitate the mounting of the impeller 1. Further, said tubular wall 4 comprises at least one pair of slits 18, which slits 18 are adjacent to each other and extend from said first end of the socket 3 towards said second end of the socket 3, at least one of said slits 18 terminating at a distance from the second end of the socket 3. Thus a finger shaped segment 19 extending from the base 21 of the tubular wall 4 is obtained, which segment 19 is deflectable in relation to neighboring parts of said tubular wall 4. The base 21 is located at the second end of the socket 3. The term "deflectable" is used meaning that the segment 19 may bend towards the neighboring parts as well as turn in relation to the neighboring parts. As the socket 3 is located between the drive shaft 2 and the impeller 1, the finger shaped segment 19 as well as the neighboring parts of the tubular wall 4 will be squeezed in the radial direction between the envelope surface of the drive shaft 2 and the through hole 9 of the impeller 1. If the impeller 1 is subject to a high momentary resistance, or the drive shaft 2 is started to rotate with a jerk, the impeller 1 may slip in relation to the drive shaft 2. When using a socket 3 according to the invention, the function of the finger shaped segment 19 is to at least partly follow the mutual movement of the impeller 1 and the drive shaft 2 and bend in the circumferential direction towards the neighboring part of the tubular wall 4. The bending of the finger shaped segment 19 intensifies the frictional force between the socket 3 and the impeller 1 and the drive shaft 2, respectively, due to the changed geometrical condition, of the finger shaped segment 19.

In the shown embodiment, the longitudinal extension of each slit 14 is parallel to the longitudinal axis of the socket 3, as is seen from the outside of the socket 3. However, the longitudinal extension of the slits 18 may be in any other suitable shape, e.g. helical, zigzag, etc. Preferably the radial extension of at least one slit 18 of each pair of slits 18, will coincide with a geometrical plane, which is separated from the longitudinal axis of the socket 3. In other words, the surface of the slit 18 will be at an angle in relation to the tangent of the outer surface of the tubular wall 4, which angle is separated from 90°. At least one of the elongated segments 19 has a smaller dimension in a circumferential direction than in the radial direction at the interface 23 between the elongated segment and the base of the tubular wall. The tubular wall further includes at least two neighboring parts 22, the at least one elongated segment being interspersed among the at least two neighboring parts. The at least two neighboring parts 22 have a larger dimension in the circumferential direction than in the radial direction at the interface 23 between the neighboring parts and the base of the tubular wall.

When the finger shaped segment 19 is bent towards the neighboring part of the tubular wall 4 and comes into contact, the two abutting surfaces which are inclined in relation to the circumferential direction of the tubular wall will force the finger shaped segment 19 to "climb up" on the neighboring part of the tubular wall 4, and be wedged between the neighboring part of the tubular wall 4 and the drive shaft 2 or the impeller 1 in order to increase the frictional force. This may be done when the entire finger shaped segment 19 is bent outwards and/or when the finger shaped segment 19 is twisted.

Preferably, the two slits 18 of each pair of slits 18 are parallel to each other. However, the respective geometrical plane in which each slit 18 is included may inter-sect each other. Furthermore, the tubular wall 4 may comprise at least two pairs of slits 18, which pairs are distributed along the periphery of said tubular wall 4. Preferably, the tubular wall 4 comprises eight pairs of slits 18, which are arranged such that two opposite slits 18 from two different pairs of slits 18 coincide with the same geometrical plane and may thus be cut at the same time. It shall be pointed out that all slits 18 extends from the first end of the socket 3, even though several pairs of slits 18 are provided.

The socket 3 may also comprise a slot 20 extending all the way from said first end to said second end of the socket 3. The function of the slot 20 is to admit a small widening of the entire socket 3 when it is pressed onto the drive shaft 2.

FEASIBLE MODIFICATIONS OF THE INVENTION

The invention is not limited only to the embodiments described above and shown in the drawings. Thus, the device as well as the pump may be modified in all kinds of ways within the scope of the appended claims. For instance, it shall be pointed out that instead of having the part of the inner surface that is adjacent to said first end of the socket, in the shape of a truncated cone, and having the part of the outer surface that is adjacent to said first end of the socket, in the shape of a cylinder, the inverse ratio may be used, which naturally will involve a differently shaped drive shaft and a differently shaped through hole of the impeller.

It shall also be pointed out that the adjusting screw is optional, because in some application there is no need for adjusting the location the one element in relation to the other element. Furthermore, the slits may be keyhole shaped, i.e. a bigger recess at the bottom of the slit, in order to get a partially weaker finger shaped segment. There-to, the finger shaped segments may be of any other suitable material than the rest of the socket in order to get the function wished for.

The invention claimed is:
1. A device for interconnecting a first element (2) and a second element (1) to each other for transmitting rotational motion, said device (3) comprising:
   an axial through hole that extends from a first end to a second end along a longitudinal axis of the device, and
   a tubular wall (4) defined by the axial through hole having a circular inner surface, the circular inner surface having a part that is adjacent to said first end and arranged for abutting said first element (2), and a circular outer surface, the circular outer surface having a part that is adjacent to said first end and arranged for abutting said second element (1),
   wherein said tubular wall (4) comprises at least one pair of slits (18), the slits in the at least one pair of slits (18) being adjacent to each other and extending from said first end towards said second end, at least one elongated segment (19), defined by each of said at least one pair of slits, and at least two neighboring parts, the at least one elongated segment being interspersed among the at least two neighboring parts,
   wherein the at least one elongated segment (19) and the at least two neighboring parts extend from a base (21) of the tubular wall, said base (21) of the tubular wall (4) being located at said second end of the device, the each at least one elongated segment having a smaller dimension in a circumferential direction than in the radial direction at the interface between the elongated segment and the base of the tubular wall, and the at least two neighboring parts having a larger dimension in the circumferential direction than in the radial direction at the interface between the neighboring parts and the base of the tubular wall,
   whereby the at least one elongated segment is deflectable in such a way as to be bendable in a circumferential direction in relation to neighboring parts and turnable with respect to the neighboring parts of said tubular wall (4),
   wherein at least one of said part of the circular inner surface and said part of the circular outer surface, is in the shape of a truncated cone.

2. The device according to claim 1, wherein the longitudinal extension of each slit (18) is parallel to the longitudinal axis of the device (3).

3. The device according to claim 1, wherein the radial extension of each slit (18) coincides with a geometrical plane, which is separated from the longitudinal axis of the device (3).

4. The device according to claim 1, wherein the tubular wall (4) comprises at least two pairs of slits (18), which pairs are distributed along the periphery of said tubular wall (4).

5. The device according to claim 4, wherein the tubular wall (4) comprises eight pairs of slits (18).

6. The device according to claim 4, wherein two opposite slits (18) from two different pairs of slits (18) coincide with the same geometrical plane.

7. The device according to claim 1, wherein the slits of each pair of slits (18) are parallel to each other.

8. The device according to claim 1, wherein the truncated cone, diverges towards the first end of the device (3).

9. The device according to claim 1, wherein the device (3) also comprises a slot (20) extending all the way from said first end to said second end.

10. A pump, comprising a device according to claim 1.

* * * * *

UNITED STATES PATENT AND TRADEMARK OFFICE
CERTIFICATE OF CORRECTION

| | | |
|---|---|---|
| PATENT NO. | : 8,814,463 B2 | Page 1 of 1 |
| APPLICATION NO. | : 12/443520 | |
| DATED | : August 26, 2014 | |
| INVENTOR(S) | : Gert Hallgren et al. | |

It is certified that error appears in the above-identified patent and that said Letters Patent is hereby corrected as shown below:

On the title page, item (30) Foreign Application Priority Data, delete "Sep. 20, 2006" and insert --Sep. 29, 2006--.

Signed and Sealed this
Twenty-fifth Day of November, 2014

Michelle K. Lee
*Deputy Director of the United States Patent and Trademark Office*